United States Patent
Redfern et al.

(10) Patent No.: US 7,496,134 B2
(45) Date of Patent: Feb. 24, 2009

(54) COMPUTATIONALLY AND MEMORY EFFICIENT TONE ORDERING SCHEME

(75) Inventors: Arthur J. Redfern, Plano, TX (US); Udayan Dasgupta, Irving, TX (US)

(73) Assignee: Texas Instruments Incorporated, Dallas, TX (US)

( * ) Notice: Subject to any disclaimer, the term of this patent is extended or adjusted under 35 U.S.C. 154(b) by 757 days.

(21) Appl. No.: 11/043,218

(22) Filed: Jan. 26, 2005

(65) Prior Publication Data

US 2005/0169358 A1 Aug. 4, 2005

Related U.S. Application Data

(60) Provisional application No. 60/542,244, filed on Feb. 4, 2004.

(51) Int. Cl.
*H04B 1/38* (2006.01)
*H04L 23/00* (2006.01)

(52) U.S. Cl. .................................. 375/222; 375/377

(58) Field of Classification Search ............... 375/222, 375/219, 295, 316, 260, 22, 377; 370/208
See application file for complete search history.

(56) References Cited

U.S. PATENT DOCUMENTS

| 7,191,387 | B1 * | 3/2007 | Massoudi | 714/796 |
| 7,406,028 | B2 * | 7/2008 | Kratochwil et al. | 370/201 |
| 2001/0031011 | A1 * | 10/2001 | Betts | 375/259 |
| 2001/0033613 | A1 * | 10/2001 | Vitenberg | 375/222 |
| 2002/0080867 | A1 * | 6/2002 | Abbas et al. | 375/222 |
| 2005/0046592 | A1 * | 3/2005 | Cooper et al. | 340/855.7 |
| 2006/0023690 | A1 * | 2/2006 | Umashankar et al. | 370/351 |
| 2006/0269010 | A1 * | 11/2006 | Betts | 375/265 |

* cited by examiner

*Primary Examiner*—Tesfaldet Bocure
(74) *Attorney, Agent, or Firm*—Steven A. Shaw; W. James Brady; Frederick J. Telecky, Jr.

(57) ABSTRACT

An integrated circuit 18 is provided that includes a memory 32 and a memory modification component 33. The memory 32 maintains a bits count, a gain, and a tone order for each of a plurality of discrete multi-tone sub-channels. The memory modification component 33 operable to control an in-service modification of at least some of the bits count, the gain, and the tone order using a single bits, gains and tone order table.

14 Claims, 3 Drawing Sheets

COMPUTATIONALLY AND MEMORY EFFICIENT TONE ORDERING SCHEME

CROSS-REFERENCE TO RELATED APPLICATIONS

This application claims priority to U.S. Provisional Application No. 60/542,244 filed Feb. 4, 2004, and entitled "Computationally and memory efficient tone ordering scheme," by Arthur Redfern, et al, incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to communications, and more particularly, but not by way of limitation, to a computationally and memory efficient tone ordering scheme.

BACKGROUND OF THE INVENTION

Digital subscriber line (DSL) communication is primarily directed to using existing telephone lines, known as the local loop, between the telephone company's central office and the customer premises to enable data communications. A series of digital subscriber line standards variations have been issued including asymmetric digital subscriber line (ADSL) and very-high-data-rate digital subscriber line (VDSL). Later digital subscriber line standards generally aim at increasing data throughput rates. The rate at which data can be transmitted through the local loop depends in part on the length of the local loop, the presence of any circuit conditioning circuits such as bridge taps in the local loop, diurnal environmental variations, and other conditions or factors.

Communications circuits may be combined in one or more integrated circuits to achieve desirable price points for consumer electronics. Several communications components including filters, amplifiers, encoders, decoders, signal processing components, error correction components, and memory may be combined or integrated in a single integrated circuit or chip. Specialized chips and/or chip sets may be developed by semiconductor manufacturers to support specific communication protocols. As new communication standards or variations of standards are released, new chips and/or chips sets are designed and released for sale.

SUMMARY OF THE INVENTION

The present disclosure, according to one embodiment, is directed to an integrated circuit includes a memory and a memory modification component. The memory maintains a bits count, a gain, and a tone order for each of a plurality of discrete multi-tone sub-channels. The memory modification component operable to control an in-service modification of at least some of the bits count, the gain, and the tone order using a single bits, gains and tone order table.

In another embodiment, the present disclosure provides a method for modifying entries in a circular data structure in a memory associated with a communication transceiver. The method includes changing a first value associated with a first entry in the circular data structure from the first value to a second value. The method includes changing a first index value to relocate the first entry from a first group of contiguous entries to a second group of contiguous entries. The method also includes using the first entry to control, at least in part, a communication transceiver.

In another embodiment, a communication system is provided that includes a first and second digital subscriber line transceivers. The first digital subscriber line transceiver has a first memory operable to define a first bits count, a first gain, and a first tone order for each of a plurality of sub-channels. The second digital subscriber line transceiver has a second memory operable to define a second bits count, a second gain, and a second tone order for each of the plurality of sub-channels. The second digital subscriber line transceiver is operable to communicate with the first digital subscriber line transceiver to coordinate in-service modifications to make the first and second bits count, the first and second gain, and the first and second tone order agree using a single bits, gain, and tone order table These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Figure 1:
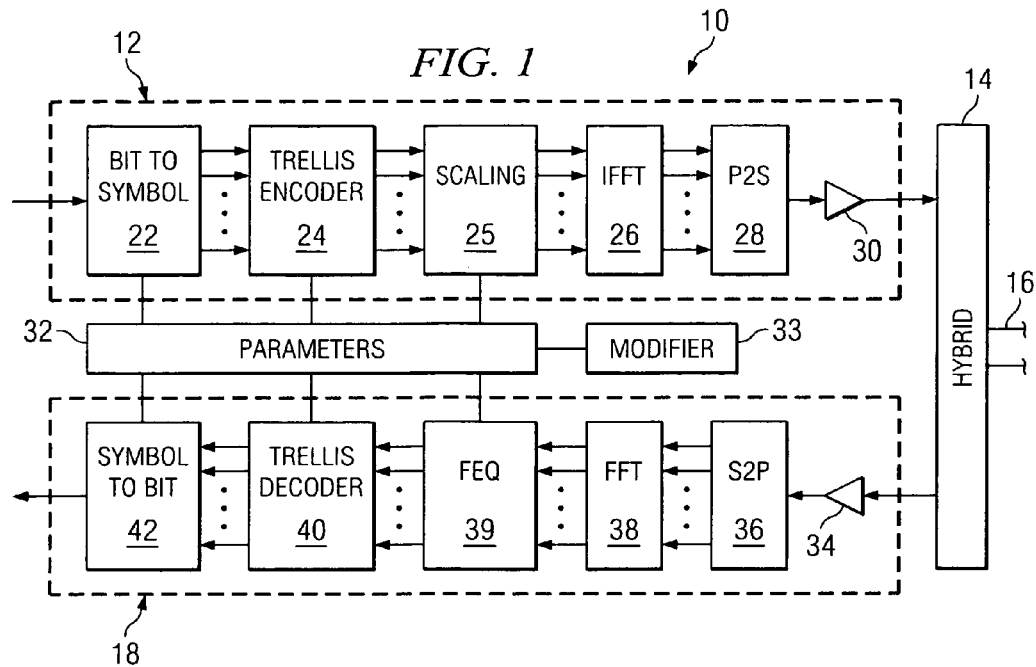
FIG. 1 is a block diagram of a transceiver according to an embodiment of the disclosure.

Turning now to FIG. 1, a block diagram of a discrete multi-tone communications transceiver 10 is depicted. A transmitter section 12 processes data and transmits a first signal based on the data into a hybrid 14 and thence onto a communication channel 16, for example an unshielded twisted pair of wires. The hybrid 14 receives a second signal from the communication channel 16 and directs it to a receiver section 18 that receives the second signal and extracts data from the second signal. The hybrid 14 is a device well known to those skilled in the art that has the general function of enabling four wire communications, two wires for transmitting and two wires for receiving, to be carried out over only two wires. The transceiver 10 may be implemented in a single integrated circuit or in two or more integrated circuits coupled to one another.

The transmitter section 12 includes a bit-to-symbol converter 22, a trellis encoder 24, a scaling component 25, an inverse fast Fourier transformer (IFFT) 26, a parallel-to-serial converter (P2S) 28, and a transmitter amplifier 30. In an embodiment, the transceiver section 12 may include additional circuit elements, not shown, such as a Reed-Solomon encoder, an interleaver, a cyclic prefix generator, a digital-to-analog converter, a digital filter, and an analog filter.

The bit-to-symbol converter 22 converts the stream of data bits into a symbol for each sub-channel or tone. In particular, the bit-to-symbol converter 22 encodes a variable number of bits of data in each symbol based on a bits count parameter for each tone defined in a parameters store 32. The bit-to-symbol converter 22 also orders the symbols according to a desirable tone order defined in the parameters store 32. The trellis encoder 24 adds redundant bits into the data stream. The transceiver 10 may be capable of operating successfully in lower signal-to-noise (SNR) situations when using the trellis encoder 24 than would be the case with out using the trellis encoder 24. The output from the trellis encoder 24 is a frequency domain signal, comprised of a plurality of sub-channel or tone values. The scaling component 25 scales the amplitude of each symbol according to a gain value for each sub-channel defined in the parameters store 32. In an embodiment, the scaling component 25 may be a frequency domain equalizer. A modifier component 33 is operable to control modifications to the parameters store 32. The IFFT 26 transforms this frequency domain signal into a time domain signal. The parallel-to-serial converter 28 serializes the time domain signal, and the transmitter amplifier 30 boosts the level of the time domain signal for introducing into the hybrid 14 and transmitting on the communication channel 16 as the first signal.

The receiver section 18 includes a receiver amplifier 34, a serial-to-parallel converter (S2P) 36, a fast Fourier transformer (FFT) 38, a frequency domain equalizer 29, a trellis decoder 40, and a symbol-to-bit converter 42. In an embodiment, the receiver section 18 may include additional circuit elements, not shown, such as a Reed-Solomon decoder, a deinterleaver, a cyclic prefix extractor, an analog-to-digital converter, a digital filter, an analog filter, a time domain equalizer, and an echo canceller. The receiver amplifier 34 boosts the level of a second signal received from the hybrid 14 to a useable level. The serial-to-parallel converter 36 converts the second signal to parallel data. The FFT 38 transforms the second signal from the time domain to the frequency domain. The frequency domain equalizer 39 restores the appropriate phase and amplitude of symbols based on the channel and gain values defined for each sub-channel in the parameters store 32, in effect dividing through by the gain applied to the same sub-channel by the scaling component 25 in the transmitter section 12. The trellis decoder 40 uses the redundancy built into the second signal to partially decode the second signal. The symbol-to-bit converter 42 orders the received symbols based on the desirable tone order defined in the parameters store 32, in effect undoing the ordering performed by the bit-to-symbol converter 22 in the transmitter section 12. The symbol-to-bit converter 42 also converts the symbol associated with each sub-channel or tone in accordance with the bits count associated with each sub-channel in the parameters store 32.

Figure 2A:
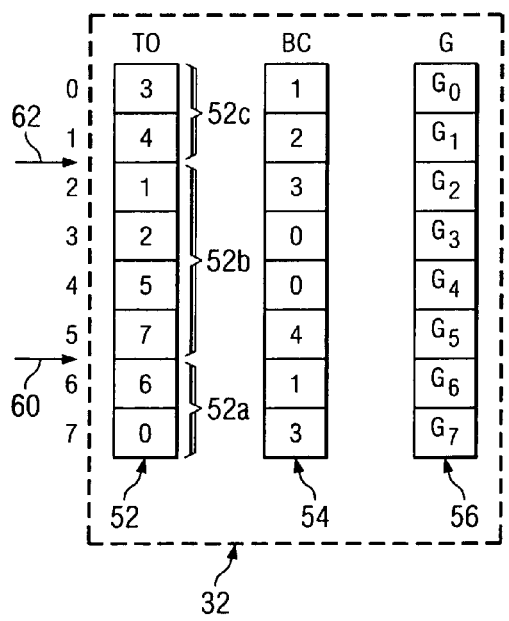
FIG. 2a is an illustration of a parameters store according to an embodiment of the disclosure.

Turning to FIG. 2a, an embodiment of the parameters store 32 is depicted. The parameters store 32 may comprise three data tables including a tone order table 52, a bits count table 54, and a gain table 56. Each of the three tables contains a number of entries equal in number to the number of sub-channels. While each of the three tables are depicted as having eight exemplary entries, in an embodiment, each table may contain 256, 512, 4096, or some other number of entries. The entries of each data table constitute an ordered sequence. For example, the entry in the tone order table 52 containing the value 3 may be referred to as the $0^{th}$ entry, and the entry in the tone order table 52 containing the value 7 may be referred to as the $5^{th}$ entry.

According to one embodiment, the position of entries in the tone order table 52 is based on the sub-channel, and the tone order table 52 maps the tone order to the sub-channel. The $0^{th}$ entry in the tone order table 52 identifies the sub-channel which is placed first in the tone order. According to the exemplary contents of the tone order table 52, the $3^{rd}$ sub-channel is placed first in the tone order. The $1^{st}$ entry in the tone order table 52 identifies the tone which is placed second in the tone order. According to the exemplary contents of the tone order table 52, the $4^{th}$ sub-channel is placed second in the tone order. The ordering of the rest of the tones is accomplished similarly. In an alternate embodiment, the position of entries in the tone order table 52 is based on the tone order, and the tone order table 52 maps the sub-channel to the tone order. In this case, the $0^{th}$ entry in the tone order table may identify the position of the $0^{th}$ sub-channel in the tone order, the $1^{st}$ entry in the tone order table may identify the position of the $1^{st}$ sub-channel in the tone order, and the $2^{nd}$ entry in the tone order table may identify the position of the $2^{nd}$ sub-channel in the tone order. In this alternate case, the exemplary contents of the tone order table 52 may change.

The bits count table 54 maps a number of bits per symbol to a sub-channel. For example, the $0^{th}$ sub-channel will be encoded with one bit, the $1^{st}$ sub-channel will be encoded with two bits, the $2^{nd}$ sub-channel will be encoded with three bits, and the $3^{rd}$ sub-channel will be encoded with zero bits (the $3^{rd}$ sub-channel will not be transmitted). The gain table 56 maps a gain to a sub-channel. For example, the $0^{th}$ sub-channel will be biased with a $0^{th}$ gain, the $1^{st}$ sub-channel will be biased with a $1^{st}$ gain, and the $2^{nd}$ sub-channel will be biased with a $2^{nd}$ gain.

Figure 2B:
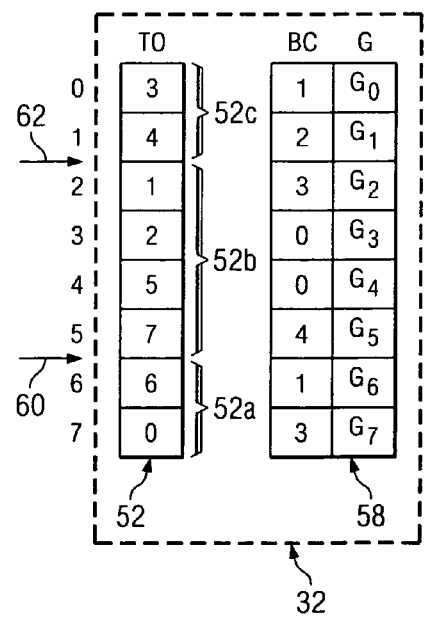
FIG. 2b is an illustration of the parameters store according to another embodiment of the disclosure.

Turning now to FIG. 2b, an alternative embodiment of the parameters data store 32 is depicted. In an embodiment, the parameters data store 32 comprises two data tables including the tone order table 52 and a combined bits count and gain table 58. Other alternative combinations of the tone order table 52, the bits count table 54, and the gain table 56 will readily occur to one skilled in the art, and all these alternative combinations are contemplated by the present disclosure. The parameters store 32 and/or the three data tables may be referred to as the bits, gains, and tone ordering table. As used herein a single bits, gains, and tones ordering table may be used to refer to a single table where a portion of the table maintains the bits count information, a portion of the table maintains the gains information, and a portion of the table maintains the tone order information. Alternatively, the term single bits, gains, and tones ordering table may be used to refer to three separate tables, a single bits count table maintaining the bits count information, a single gains table maintaining the gains information, a single tone order table maintaining the tone order information.

The values contained in the entries of the three data tables are determined to desirably promote reliable communications between transceivers 10, for example between a first VDSL transceiver, similar to transceiver 10, located in a central office and a second VDSL transceiver, similar to transceiver 10, located at the home of a VDSL subscriber. The communicating transceivers 10, for example the first VDSL transceiver and the second VDSL transceiver, desirably assign common values to the entries in the tone order table 52, the-bits count table 54, and the gain table 56.

The characteristics of the communication channel 16 may vary over time, for example as a result of daily temperature and electromagnetic interference variations. To accommodate the changing characteristics of the communication channel 16, it is desirable to modify the values stored in the parameters store 32 in the first VDSL transceiver and the second VDSL transceiver. In an embodiment, the parameters store 32 may be updated by frequent small updates as conditions change. Because both transceivers 10, for example a first VDSL transceiver and a second VDSL transceiver, depend upon using the parameters store 32 having common values to promote their communications, it is desirable that modification of the parameters store 32 be coordinated between the communicating transceivers 10.

A preferred embodiment is directed to modifying the parameters store 32 through an in-service modification process to conserve the limited memory space available in a processor or an application specific integrated circuit (ASIC). Conserving memory space in processors and/or ASICs increases in importance as the number of sub-channels grows from one generation of DSL standards to the next. As used herein, an in-service modification refers to modifying the actively accessed parameters store 32 in small incremental modifications. These modifications may take place between accesses to the parameters store 32, for example by the first VDSL transceiver and by the second VDSL transceiver. The state of the parameters store 32 after any incremental modification desirably remains self-consistent. In this way, the transceivers 10 may continue to employ the parameters store 32 to promote communications throughout the sequence of incremental modifications to the parameters store 32 necessary to complete a modification of the parameters store 32. This approach is distinguished from a less memory efficient technique which would involve maintaining multiple copies of the parameters store 32, for example two tone order tables, two bits count tables, and two gain tables. Such a less memory efficient technique may completely update a second tone order table, a second bits count table, a second gain table and there after and then direct receiver and transmitter components to stop referencing a first tone order table, a first bits count table, and a first gain table and begin referencing the second tone order table, the second bits count table, and the second gain table. A disadvantage of this less memory efficient technique is that it consumes about twice as much or more memory to implement the parameters store 32 as the preferred embodiment in-service modification system and technique disclosed herein.

The modifier component 33 controls or mediates the in-service modifications of the parameters store 32. The modifier component 33 may monitor the changing characteristics of the communication channel 16 and determine modifications of the parameters store 32 that are desirable to promote reliable communications. Alternately, a processor (not shown) may monitor the changing characteristics of the communication channel 16, determine the modifications of the parameters store 32 that are desirable to promote reliable communications, and convey the modifications to the modifier component 33.

To accomplish the contemplated in-service modification of the parameters store 32, it is desirable to divide the larger scale process of modifying the complete parameters store 32 into a sequence of small scale modifications. Each small scale modification leaves the parameters store 32 in a self-consistent state. Some of the small scale modifications may involve swapping of entries in the tone order table 52. The swapping of entries in the tone order table 52 may involve copying the contents of a first entry to a temporary memory location before overwriting the location of the first entry, but this should not be confused with writing the modifications to a complete duplicate tone order table 52.

An in-service modification may consist of modifying the value of a single entry in the parameters store 32, for example a gain value in the gain table 56. An in-service modification may include swapping a first entry with a second entry in the tone order table 52. An in-service modification may consist of a combination of modifying the value of the first entry in the tone order table 52 followed by swapping the first entry with the second entry in the tone order table 52. As used herein, swapping entries in the tone order table 52 may refer to copying the contents of the first entry to the location of the second entry and copying the contents of the second entry to the location of the first entry. As is well understood by one skilled in the art, this operation may be accomplished, in part, by copying the contents of the second entry to a temporary memory location prior to overwriting the contents of the second entry at the location of the second entry with the contents of the first entry. Moving a first entry to a new location within the tone order table 52 while maintaining relative positions of other entries to themselves may be accomplished by successively swapping the first entry with each of the entries between the first entry and the new location. An in-service modification may consist of many table value changes and tone order table entry swaps.

In one embodiment, entries in the tone order table 52 which are associated, by the sub-channel, with a zero value in the bits count table 54 are located adjacent to each other, entries associated with a value of greater than one in the bits count table 54 are located adjacent to each other, and entries associated with a one value in the bits count table 54 are located adjacent to each other. The entries in the tone order table 52 which are associated with a bits count of greater than one are located between the entries associated with a zero value in the bits count table 54 and the entries with a one value in the bits count table 54. This structuring of the content of the entries in the tone order table 52, which may be referred to as a segregated data table, may promote more efficient processing of messages by the transmitter section 12 and/or the receiver section 18. Note that sub-channels associated with a bits count of zero are not transmitted. Additionally, sub-channels associated with a bits count of one may be located in a portion of the subject communications bandwidth that experiences high attenuation or high noise levels.

The exemplary content of the tone order table 52 depicted in FIG. 2a and 2b conforms to the description of the segregated data table above. Note that sub-channel 3 and sub-channel 4, both associated with a zero value in the bits count table 54, are located contiguous to each other in the $0^{th}$ and $1^{st}$ positions in the tone order table 52, in what may be referred to as a zero bits segment 52a of the tone order table 52. Sub-channels 1, 2, 5, and 7, all associated with greater than one values in the bits count table 54, are located contiguous to each other in the $2^{nd}$, $3^{rd}$, $4^{th}$, and $5^{th}$ positions in the tone order table 52, in what may be referred to as a greater than one bits segment 52b of the tone order table 52. Sub-channels 6 and 0, both associated with a one value in the bits count table 54, are located contiguous to each other in the 6th and 7th positions of the tone order table 52, in what may be referred to as a one bits segment 52c of the tone order table 52.

Performing in-service modifications of a segregated table, for example the tone order table 52 in the above example, may entail additional steps to perform a swapping operation. Because in-service modifications may change the sizes of the segments of the tone order table 52, a plurality of indexes are employed to indicate the boundaries of the segments. A first index 60 may point to the first entry in the one bits segment 52a or to the last entry in the greater than one bits segment 52b, thereby identifying the boundary between the greater than one bits segment 52b and the one bits segment 52a. A second index 62 may point to the first entry in the greater than one bits segment 52b or to the last entry in the zero bits segment 52c, thereby identifying the boundary between the zero bits segment 52c and the greater than one bits segment 52b.

When the bits count value associated with a sub-channel in the bits count table 54 is changed from one to two, for example, a first entry in the tone order table 52 associated with the subject sub-channel must be relocated from the one bits segment 52a to the greater than one bits segment 52b. If the first entry is located at the boundary with the greater than one bits segment 52b, adjacent to the last entry in the greater than one bits segment 52b, the first entry may be relocated by modifying the first index 60 to locate the first entry in the greater than one bits segment 52b. If the first entry is not located at the boundary with the greater than one bits segment 52b, the first entry must first be swapped with a second entry that is located at the boundary with the greater than one bits segment 52b and then the first index may then be modified to locate the first entry in the greater than one bits segment 52b. Similar two step swapping operations may be employed for other modifications involving relocating an entry to a different segment of the tone order table 52. When the bits count value is changed from one to zero, the first entry may first be relocated from the one bits segment 52a to the greater than ones bits segment 52b and then relocated from the greater than ones bits segment 52b to the zero bits segment 52c.

Figure 3:
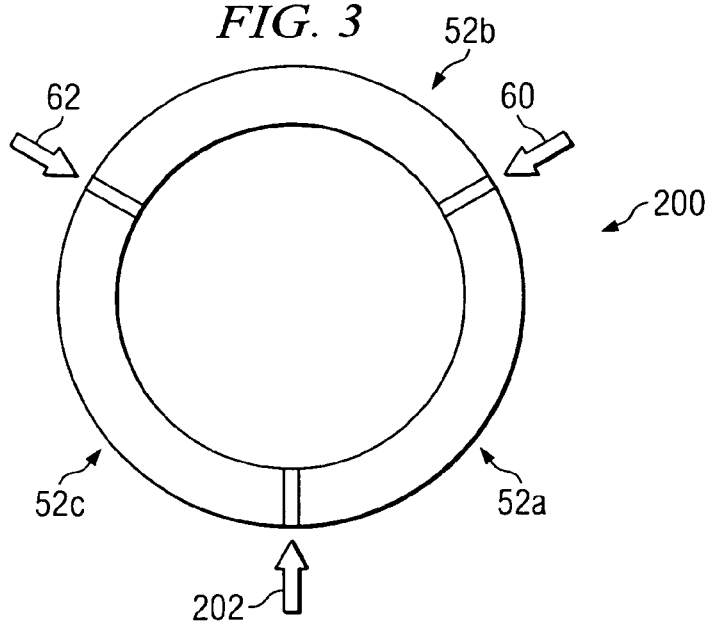
FIG. 3 is an illustration of a circular data structure according to an embodiment of the disclosure.

Turning now to FIG. 3, a circular tone order table 200 is depicted which is an alternative embodiment of the tone order table 52. The locations of the entries in the circular tone order table 200 are conceived to wrap around in the sense that the entry after the last entry in the one bits segment 52a is the first entry in the zero bits segment 52c and the entry before the first entry in the zero bits segment 52c is the last entry in the one bits segment 52a. Circular data structures and their implementation means are well known to those skilled in the art. A third index 202 may be employed to designate the boundary between the one bits segment 52a and the zero bits segment 52c. In an embodiment employing a circular tone order table 200, modifying the bits count of a sub-channel from one to zero or from zero to one may be accomplished in three steps. The first step is optional and moves the associated entry in the circular tone order table 200 within the subject segment to the boundary between the one bits segment 52a and the zero bits segment 52c. This first step is not needed if the entry is already located at the boundary. The second step modifies the third index 202 to relocate the entry within the appropriate segment based on the change of bits count value. The third step modifies the actual bits count value in the bits count table 54. This three step process simplifies the relocation operation needed for a non-circular tone order data table.

Figure 4A:
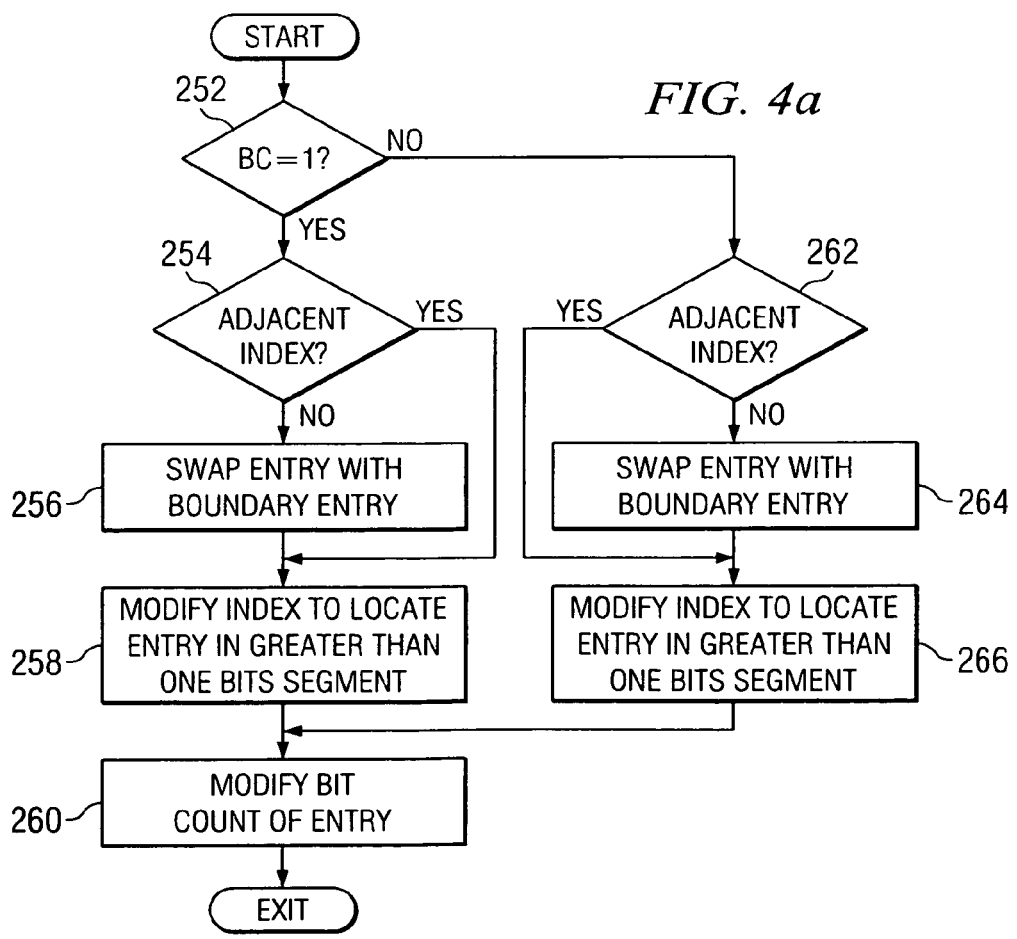
FIG. 4a is a flow chart of a method for performing an in-service modification of an entry in the circular data structure according to an embodiment of the disclosure.

Turning now to FIG. 4a, a flow diagram depicts an in-service modification process for changing the bits count value to greater than one from a prior value of either one or zero. In block 252, if the present bits count value of the subject sub-channel is one, the process proceeds to block 254. In block 254, if the associated entry in the tone order table 52 is not adjacent to the boundary between the one bits segment 52a and the greater than one bits segment 52b, the process proceeds to block 256. In block 256, the entry is swapped with the entry in the one bits segment 52a which is adjacent to the greater than one bits segment 52b. In block 254, if the associated entry in the tone order table 52 is already adjacent to the boundary between the one bits segment 52a and the greater than one bits segment 52b, the process proceeds to directly to block 258. In block 258, the first index 60 is modified so as to locate the associated entry in the greater than one bits segment 52b. The process proceeds to block 260 where the bit count value of the subject sub-channel is modified to the desirable value in the bits count table 54.

In block 252, if the present bits count value of the subject sub-channel is not one, the process proceeds to block 262. In block 262, if the associated entry in the tone order table 52 is not adjacent to the boundary between the zero bits segment 52c and the greater than one bits segment 52b, the process proceeds to block 264. In block 264, the entry is swapped with the entry in the zero bits segment 52c which is adjacent to the greater than one bits segment 52b. The process proceeds to block 266. In block 264, if the associated entry is already adjacent to the boundary between the zero bits segment 52c and the greater than one bits segment 52b, the process proceeds to directly to block 266. In block 266, the third index 202 is modified so as to locate the entry in the greater than one bits segment 52b. The process proceeds to block 260 where the bit count value of the subject sub-channel is modified to the desirable value in the bits count table 54.

Figure 4B:
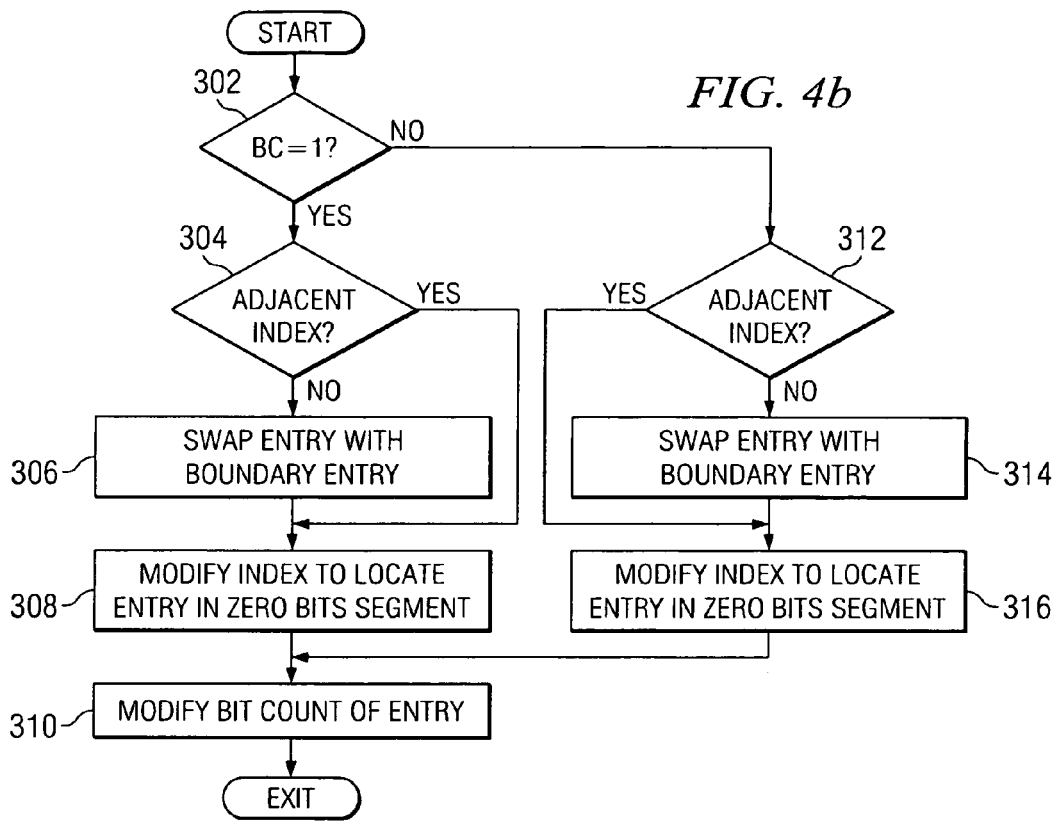
FIG. 4b is a flow chart of another method for performing an in-service modification of the entry in the circular data structure according to an embodiment of the disclosure.

Turning now to FIG. 4b, a flow diagram depicts an in-service modification process for modifying the bits count value to zero from a prior value of either one or zero. Note that the structure of this process is very similar to the process described with reference to FIG. 4a. In block 302, if the present bits count value of the subject entry is one, the process proceeds to block 304. In block 304, if the associated entry in the tone order table 52 is not adjacent to the boundary between the one bits segment 52a and the zero bits segment 52c, the process proceeds to block 306. In block 306, the entry is swapped with the entry in the one bits segment 52a which is adjacent to the zero bits segment 52c. In block 304, if the associated entry in the tone order table 52 is already adjacent to the boundary between the one bits segment 52a and the zero bits segment 52c, the process proceeds to directly to block 308. In block 308, the third index 202 is modified so as to locate the entry in the zero bits segment 52c. The process proceeds to block 310 where the bit count value of the subject sub-channel is modified to zero in the bits count table 54.

In block 302, if the present bits count value of the subject sub-channel is not one, the process proceeds to block 312. In block 312, if the associated entry in the tone order table 52 is not adjacent to the boundary between the zero bits segment 52c and the greater than one bits segment 52b, the process proceeds to block 314. In block 314, the entry is swapped with the entry in the greater than one bits segment 52b which is adjacent to the zero bits segment 52c. The process proceeds to block 316. In block 314, if the associated entry is already adjacent to the boundary between the zero bits segment 52c and the greater than one bits segment 52b, the process proceeds to directly to block 316. In block 316, the second index 62 is modified so as to locate the subject entry in the greater than zero bits segment 52c. The process proceeds to block 310 where the bit count value of the subject sub-channel is modified to zero in the bits count table 54.

Figure 4C:
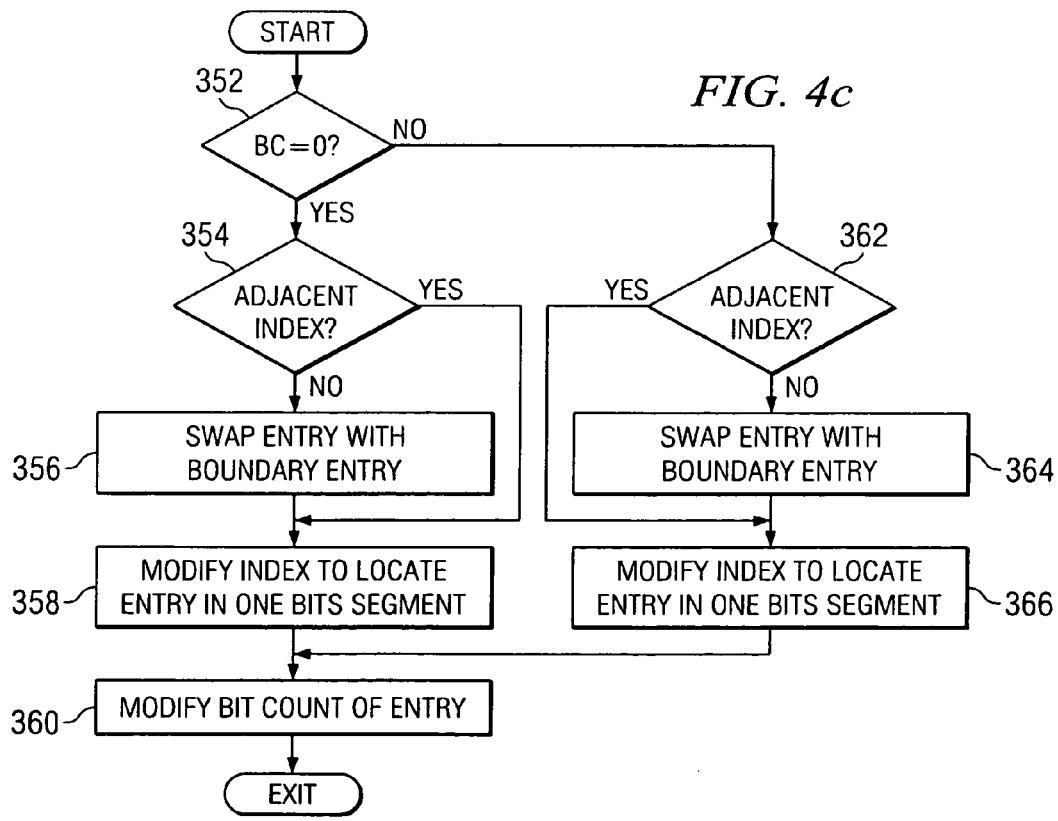
FIG. 4c is a flow chart of another method for performing an in-service modification of the entry in the circular data structure according to an embodiment of the disclosure.

Turning now to FIG. 4c, a flow diagram depicts an in-service modification process for modifying a bits count value to one from a prior value of either greater than one or zero. Note that the structure of this process is very similar to the processes described with reference to FIG. 4a and to FIG. 4b. In block 352, if the present bits count value of the subject sub-channel is zero, the process proceeds to block 354. In block 354, if the associated entry in the tone order table 52 is not adjacent to the boundary between the one bits segment 52a and the zero bits segment 52c, the process proceeds to block 356. In block 356, the entry is swapped with the entry in the zero bits segment 52c which is adjacent to the greater than one bits segment 52b. In block 354, if the associated entry in the tone order table 52 is already adjacent to the boundary between the one bits segment 52a and the zero bits segment 52c, the process proceeds to directly to block 358. In block 358, the third index 202 is modified so as to locate the entry in the one bits segment 52a. The process proceeds to block 360 where the bit count value of the subject sub-channel is modified to one in the bits count table 54.

In block 352, if the present bits count value of the subject sub-channel is not zero, the process proceeds to block 362. In block 362, if the associated entry in the tone order table 52 is not adjacent to the boundary between the one bits segment 52a and the greater than one bits segment 52b, the process proceeds to block 364. In block 364, the entry is swapped with the entry in the greater than one bits segment 52b which is adjacent to the one bits segment 52a. The process proceeds to block 366. In block 364, if the associated entry in the tone order table 52 is already adjacent to the boundary between the one bits segment 52a and the greater than one bits segment 52b, the process proceeds to directly to block 366. In block 366, the first index 60 is modified so as to locate the entry in the one bits segment 52a. The process proceeds to block 360 where the bit count value of the subject sub-channel entry is modified to one in the bits count table 54.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. An integrated circuit, comprising:
    a memory to maintain a bits count, a gain, and a tone order for each of a plurality of discrete multi-tone sub-channels; and
    a memory modification component operable to control an in-service modification of at least some of the bits count, the gain, and the tone order using a single ordered bits table, a single ordered gains table and a single ordered tone order table.

2. The integrated circuit of claim 1, wherein the single bits, gains, and tone order table is further defined as only one bits count table maintaining the bits count information, only one gains table maintaining the gains information, and only one tone order table maintaining the tone order information.

3. The integrated circuit of claim 1, wherein the memory supports digital subscriber line communications, and wherein the bits count, the gain, and the tone order is further defined as for 4096 discrete multi-tone sub-channels.

4. The integrated circuit of claim 1, wherein a circular buffer is used to store the tone order.

5. The integrated circuit of claim 1, wherein the in-service modification involves swapping the tone order associated with a first sub-channel with the tone order associated with a second sub-channel.

6. An integrated circuit, comprising:
    a memory to maintain a bits count, a gain, and a tone order for each of a plurality of discrete multi-tone sub-channels; and
    a memory modification component operable to control an in-service modification of at least some of the bits count, the gain, and the tone order using one ordered table having a first table portion maintaining bits count information, a second table portion maintaining gain information, and a third table portion maintaining tone order information.

7. A communication system, comprising:
    a first digital subscriber line transceiver having a first memory operable to define a first bits count, a first gain, and a first tone order for each of a plurality of sub-channels; and
    a second digital subscriber line transceiver having a second memory operable to define a second bits count, a second gain, and a second tone order for each of the plurality of sub-channels, and wherein the second digital subscriber line transceiver is operable to communicate with the first digital subscriber line transceiver to coordinate in-service modifications to make the first and second bits count, the first and second gain, and the first and second tone order agree using a single bits, gain, and tone order table.

8. The communication system of claim 7, wherein the single bits, gains, and tone order table is further defined as only one table having a first table portion maintaining bits count information, a second table portion maintaining gain information, and a third table portion maintaining tone order information.

9. The communication system of claim 7, wherein the single bits, gain, and tone order table is further defined as a single bits count table maintaining the bits count information, a single gains table maintaining the gains information, and a single tone order table maintaining the tone order information.

10. The communication system of claim 7, wherein the first memory stores the first tone order of each sub-channel as an entry in a circular data structure, the entries associated with a bits count value of zero contiguous to one another, the entries associated with a first bits count value of greater than one contiguous to one another, and the entries associated with a first bits count value of one contiguous to one another, wherein the entries in the circular data structure are associate with bits count values by the sub-channel.

11. The communication system of claim 10, wherein a first index identifies the boundary between the entries associated with a first bits count value of zero and the entries associated with a first bits count value of greater than one, a second index identifies the boundary between the entries associated with a first bits count value of greater than one and the entries associated with a first bits count value of one, and a third index identifies the boundary between the entries associated with a first bits count value of one and the entries associated with a first bits count value of zero.

12. The communication system of claim 11, wherein the first digital subscriber line transceiver accomplishes an in-service modification of a first bits count value associated with a first sub-channel from a value of greater than one to a value of one by optionally swapping the location of the entry associated with the first sub-channel with the entry associated with a first bits count value of greater than one that is adjacent to one of the entries associated with the first bits count value of one, changing the first bits count value associated with the first sub-channel to one, and revising the second index such that the entry associated with the first sub-channel is thereafter located located among the entries associated with a first bits count value of one; wherein the first digital subscriber line transceiver accomplishes an in-service modification of a first bits count value associated with a second sub-channel from a value of one to a value of greater than one by optionally swapping the location of the entry associated with the second sub-channel with the entry associated with a first bits count value of one that is adjacent to one of the entries associated with the first bits count value of greater than one, changing the first bits count value associated with the second sub-channel to the value which is greater than one, and revising the second index such that the entry associated with the second sub-channel is thereafter located among the entries associated with a first bits count value of greater than one; wherein the first digital subscriber line transceiver accomplishes the in-service modification of a first bits count value associated with a third sub-channel from a value of one to a value of zero by optionally swapping the location of the entry associated with the third sub-channel with the entry associated with the first bits count value of one that is adjacent to one of the entries associated with the first bits count value of zero, changing the first bits count value associated with the third sub-channel to zero, and revising the third index such that the entry associated with the third sub-channel is thereafter located among the entries associated with a first bits count value of zero; and wherein the first digital subscriber line transceiver accomplishes the in-service modification of a first bits count value associated with a fourth sub-channel from a value of zero to a bits count value of one by optionally swapping the location of the entry associated with the fourth sub-channel with the entry associated with the first bits count value of zero that is adjacent to one of the entries having the first bit count value of one, changing the bits count value associated with the fourth sub-channel to one, and revising the third index such that the entry associated with entry associated with the fourth sub-channel is thereafter located among the entries having a first bits count value of one.

13. The communication system of claim 10, wherein the entries associated with a first bits count value of greater than one are located in memory locations between the memory locations of the entries associated with a first bits count value of zero and the memory locations of the entries associated with a first bits count value of one.

14. The communication system of claim 10, wherein the first and second digital subscriber line transceivers support an asynchronous digital subscriber line communication protocol.

* * * * *